US006924992B2

(12) United States Patent
Gaudin et al.

(10) Patent No.: US 6,924,992 B2
(45) Date of Patent: Aug. 2, 2005

(54) METHOD AND DEVICE FOR CONTROLLING POWER SUPPLY

(75) Inventors: Christophe Gaudin, Clichy (FR); Mohammed Karimi, Orsay (FR)

(73) Assignee: Electricite de France (Service National), Paris (FR)

( * ) Notice: Subject to any disclaimer, the term of this patent is extended or adjusted under 35 U.S.C. 154(b) by 0 days.

(21) Appl. No.: 10/363,720

(22) PCT Filed: Sep. 5, 2001

(86) PCT No.: PCT/FR01/02748

§ 371 (c)(1),
(2), (4) Date: Jan. 20, 2004

(87) PCT Pub. No.: WO02/21668

PCT Pub. Date: Mar. 14, 2002

(65) Prior Publication Data

US 2004/0114408 A1 Jun. 17, 2004

(30) Foreign Application Priority Data

Sep. 5, 2000 (FR) ............................. 00 11282

(51) Int. Cl.⁷ ............................................. H02M 5/45
(52) U.S. Cl. ........................................ 363/37; 363/40
(58) Field of Search ................... 363/34, 37, 40, 363/131, 132; 315/209 R, 224, 244, 247, 248

(56) References Cited

U.S. PATENT DOCUMENTS

| | | | |
|---|---|---|---|
| 5,283,727 A | 2/1994 | Kheraluwala et al. | |
| 5,410,221 A | 4/1995 | Mattas et al. | |
| 5,510,974 A | * 4/1996 | Gu et al. | 363/134 |
| 5,682,086 A | 10/1997 | Moo et al. | |
| 5,917,717 A | 6/1999 | Arts et al. | |
| 6,034,489 A | 3/2000 | Weng | |
| 6,107,753 A | * 8/2000 | Qian | 315/247 |
| 6,570,780 B2 | * 5/2003 | Furukawa et al. | 363/98 |

OTHER PUBLICATIONS

1998 IEEE; "New Charge Pump Power Factor Correction Electronic Ballast with a Wide Range of Line Input Voltage", XP–000873670, J. Qian, et al., 4 pages.

* cited by examiner

*Primary Examiner*—Adolf Berhane
(74) *Attorney, Agent, or Firm*—Blakely Sokoloff Taylor & Zafman

(57) ABSTRACT

The invention relates to a power supply control device comprising a configuration comprising a voltage source, a resonant inverter circuit powered by said source and comprising a plurality of switch half-bridges connected to the terminals of capacitor means, said configuration also comprising means for controlling the opening and closing of said switches and means for modifying the chopper frequency, a bridge of diode-forming elements connected between the source and the half-bridges of the inverter circuit, and resonant capacitor means connected between the midpoints of the branches of the diode bridge and the midpoints of the half-bridges of the inverter circuit, the device being characterized in that the resonant means further comprise inductor means connected on either side of the bridge of diode-forming elements.

8 Claims, 2 Drawing Sheets

METHOD AND DEVICE FOR CONTROLLING POWER SUPPLY

The present invention relates to electronic power supplies.

A particularly advantageous application of the invention lies in providing low frequency inverters or for providing variable speed control for induction motors.

A general object of the invention is to propose a high power electronic power supply which presents low harmonic pollution and which makes it possible to provide variable frequency control.

The present technique for controlling the current fed to induction motors with a low level of harmonic pollution consists in inserting a boost type stage. In this additional stage, current is controlled by means of a series-connected inductor by switching a switch.

Such a circuit provides active filtering of the current and enables a current of controlled magnitude to be obtained at the input of the load, and in particular a current that is quasi-sinusoidal, for example.

The advantage of that solution is that it provides current that is "clean", i.e. from which harmonic emission remains low. That solution is therefore at present being investigated by manufacturers in order to satisfy Standard 1000-3-2, which puts limits on harmonic emissions. This applies in particular to variable speed applications associated with induction motors (for example variable speed air conditioners or variable speed household electrical appliances).

Nevertheless, that solution presents the drawback of extra cost that is relatively large, since it requires an additional stage, and in particular an additional static switch.

Simultaneously, novel electronic structures that are "clean" have appeared in the field of compact fluorescent lighting. Such structures use a power supply of the charge pump type which relies on using oscillations at high frequency (HF). All along an input voltage half-wave, a storage capacitor is charged by means of such oscillations. This charging takes place progressively with the level of the input voltage. At the output, a current waveform is obtained that is close to sinusoidal and therefore "clean", together with a high power factor.

Such structures are designed to power electronic ballasts or "chokes". They are generally half-bridge structures including a series resonant circuit. The switching frequency of the switches in the half-bridge(es) is equal to the natural frequency of the resonant circuit. An output signal is thus obtained at a frequency which is fixed, equal to the frequency of the HF oscillations of the resonant circuit, i.e. in general 30 kilohertz (kHz) for lighting purposes.

Such structures are therefore not suitable for providing variable control.

The article by J. Qian et al., entitled "New charge pump power factor correction electronic ballast with a wide range of line input voltage" (Feb. 15–19, 1998, IEEE) describes an electronic ballast for powering lamps in which the chopper frequency of the switches is modified to control the delivered mean current and to provide power that is constant.

The present invention provides a power supply control device comprising a configuration comprising a voltage source, a resonant inverter circuit powered by said source and comprising a plurality of switch half-bridges connected to the terminals of capacitor means, said configuration also comprising means for controlling the opening and closing of said switches and means for modifying the chopper frequency, a bridge of diode-forming elements connected between the source and the half-bridges of the inverter circuit, and resonant capacitor means connected between the midpoints of the branches of the diode bridge and the midpoints of the half-bridges of the inverter circuit, the device being characterized in that the resonant means further comprise inductor means connected on either side of the bridge of diode-forming elements.

Such a device makes it possible to modify chopper control in order to obtain output frequencies of Hz order by controlling the switches with chopper frequencies of kHz order.

The invention also provides a method of controlling a power supply including a device of the above-specified type, in which the chopper frequency of the means for causing the switches to open and close is modified.

The invention provides in particular a low frequency inverter or a device for controlling an induction motor, characterized in that it is constituted by such a power supply device.

Other characteristics and advantages of the invention appear further from the following description which is purely illustrative and non-limiting, and which should be read with reference to the accompanying drawings, in which:

FIG. 1 is a circuit diagram of a configuration in accordance with an embodiment of the invention;

FIG. 2 plots the load current obtained at the load terminals with that configuration;

The circuit comprises two branches ADB and AEB connected in parallel between a point A and a point B. Each of the branches comprise two diodes connected in series. The diodes D1 and D2 have their cathodes connected to B and their anodes respectively connected to D and to E.

The circuit further comprises:

a low frequency sinusoidal signal generator having one terminal connected to the first branch at point D between the diodes D1 and D3 and its other terminal connected to the second branch at point E between diodes D2 and D4;

a diode bridge constituted by two parallel branches BJC and BKC connected between the point B and a point C, each branch having two diodes. The diodes D5 and D6 have their anodes connected to B and their cathodes connected to J and K respectively in series with the diodes D7 and D8 respectively. The diodes D7 and D8 are connected between the points J and K respectively and the point C, and they are in the same direction as the diodes D5 and D6 respectively;

an inverter constituted by an H-configuration bridge of switches connected between the points C and A and comprising four switches S1 and S3 in a branch CFA, S2 and S4 in a branch CGA. S1 and S2 connect the point C to the points F and G respectively, and S3 and S4 connect the pints F and G respectively to the point A. The load is connected between points F and G;

a storage capacitor Cs connected in parallel with the H bridge between the points C and A; and two resonant circuits constituted by two branches connected respectively between the points J and F and K and G, and comprising respective capacitors C1 and C2 together with two inductors La and Lb on either side of the diode bridge. In this configuration, the inductors are not associated with the capacitors, but are shared between the set of resonant capacitors.

The switches S1 and S4 and the switches S2 and S3 are opened and closed simultaneously, with the switches in the same half-bridge being switched in alternation (when S1 is open, S3 is closed, and vice versa).

The opening and closing cycle of the switches in the H bridge is controlled at a frequency which is varied in order to control the power supply to the load, which frequency is lower than the resonant frequency of the oscillating circuits.

Figure 2:
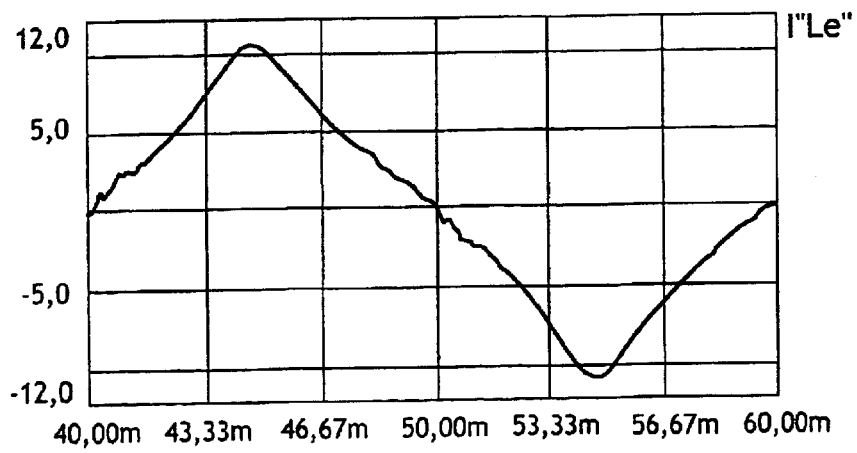

As shown in FIG. 2, operation is as follows (for an on/off cyclical ratio which is specifically 50%, but which could be different, depending on the kind of control that is to be implemented):

Phase 1: S1 and S4 are open, S2 and S3 are closed, D5 is conductive, D7 is blocked.

The capacitor C1 of the resonant circuit charges via La, C1, and the switch S3 until the diode D7 becomes conductive or until the current through La becomes zero.

Phase 2: S1 and S4 are open, S2 and S3 are closed, D5 and D7 are conducive.

If the diode D7 begins to conduct, the power supply will charge the storage capacitors Cs directly via La and Lb until this current becomes zero.

Phase 3: S1 and S4 are open, S2 and S3 are closed, D5 and D7 are blocked.

When the current flowing through the inductors becomes zero, the power supply is completely decoupled from the load. The capacitor Cs continues to deliver current to the load.

Phase 4: S1 and S4 are closed, S2 and S3 are open, D7 is conductive.

The triggering of S1 causes current to oscillate in the resonant circuits, with this terminating by the diodes D6 and D7 becoming conductive (or the current passing through the inductors becoming zero) and the voltage across the capacitors C1 and C2 reversing.

Phase 5 and 6: same situations as during phases 1 and 2 with D5 and D7 being interchanged.

The load current then obtained at the load terminals is of the type shown in FIG. 2.

It will readily be understood that by adjusting the frequency of the on/off cycle of the switches it is possible to modify the mean magnitude of the load current, and thus to regulate the power delivered to the load.

It should be observed that the inductors La and Lb positioned on either side of the diode bridge serve not only to provide greater "decoupling" between the input power supply source and the output storage capacitor, but also to reduce harmonics to a great extent.

It should be observed that the invention is also advantageously applicable to a three-phase power supply.

Figure 1:
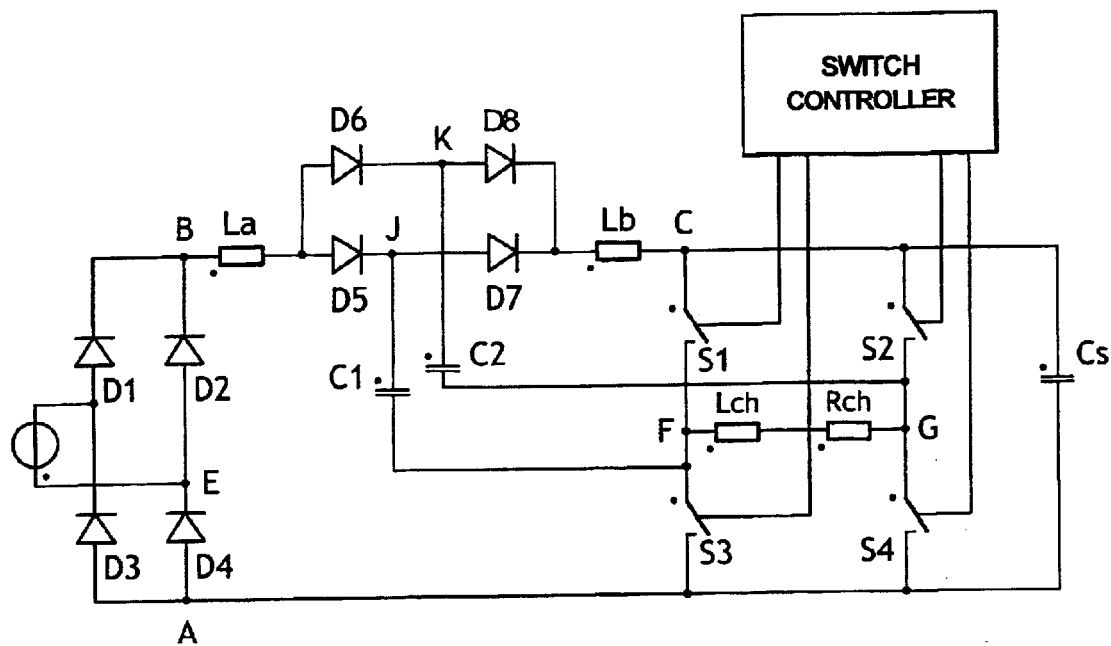
FIG. 1 shows a charge pump circuit having two half-bridges and suitable for providing a single phase power supply in accordance with an embodiment of the invention.
Figure 3:
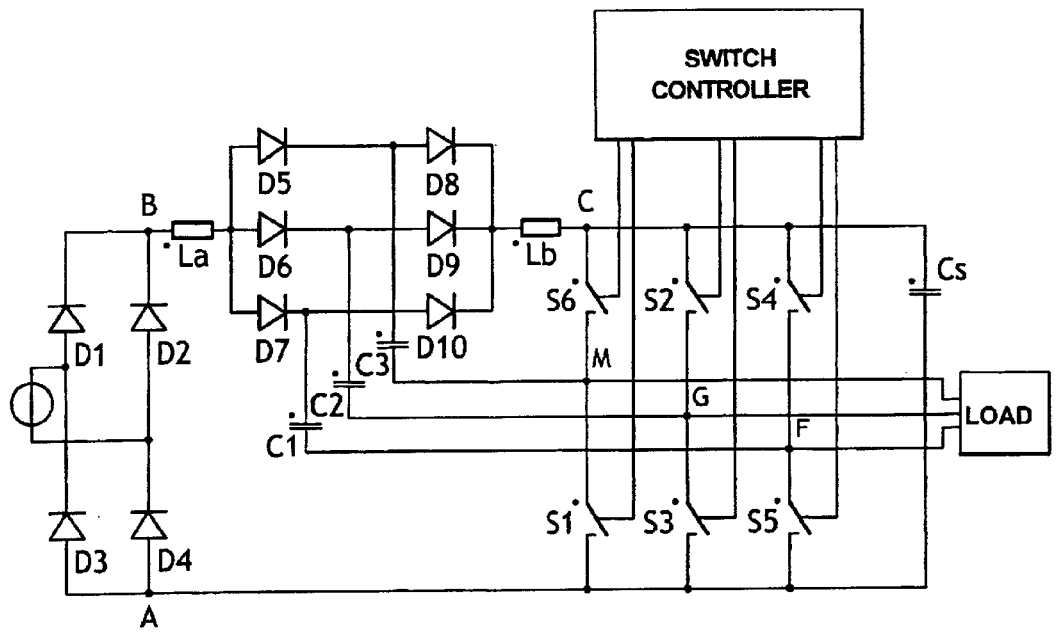
FIG. 3 shows one possible configuration for providing a three-phase power supply.

This is shown by the configuration of FIG. 3. Compared with the configuration of FIG. 1, this configuration has two additional diodes D9 and D10 connected in parallel between the points B and C, an additional half-bridge constituted by switches S5 and S6, and a third resonant circuit C3, La. The load is under three-phase control, being connected to the points F, G, and M. The switches are controlled using pulse width modulation at the same frequency but with phase offsets such that the three half-bridges feed the storage capacitor in succession.

It is shown that changing the chopper frequency of the inverter in such a configuration serves to regulate the power delivered to the load.

The advantages of this configuration are thus similar to those described above with reference to the configuration of FIG. 1. In addition, this configuration makes it possible to use only two inductors (instead of three as is necessary in a configuration where the inductors are connected in series with the capacitors C1, C2, and C3).

A structure of the type described above can advantageously be used for making pulse width modulated inverters or for making variable speed controllers.

By way of example, it enables output powers of 1 kilowatt (kW) and output frequencies of 1 to 50 kHz to be obtained, which satisfies the needs of household electrical applications in terms of controlling induction motors.

The various components are advantageously dimensioned as follows: capacitances are selected for the various capacitors as a function of the desired power. Then the inductance of the inductor Lb is fixed so as to obtain a resonant frequency that is twice the maximum switching frequency of the switches (transistors). Finally, the inductance of La is adjusted to reduce the level of harmonics without changing the overall behavior of the circuit.

Other variant embodiments can naturally also be envisaged.

In particular, means may advantageously be provided on the above-described circuits that serve, in operation, to disconnect the oscillating subcircuits to which the midpoints of the various switch half-bridges are connected independently of one another. Such disconnection can be achieved, for example, by means of controlled switches placed in the various branches connecting the midpoints of the switch half-bridges to the oscillating subcircuits.

In another variant, in a three-phase configuration, it can be possible to achieve clean power supply using only one resonant circuit.

Figure 4:
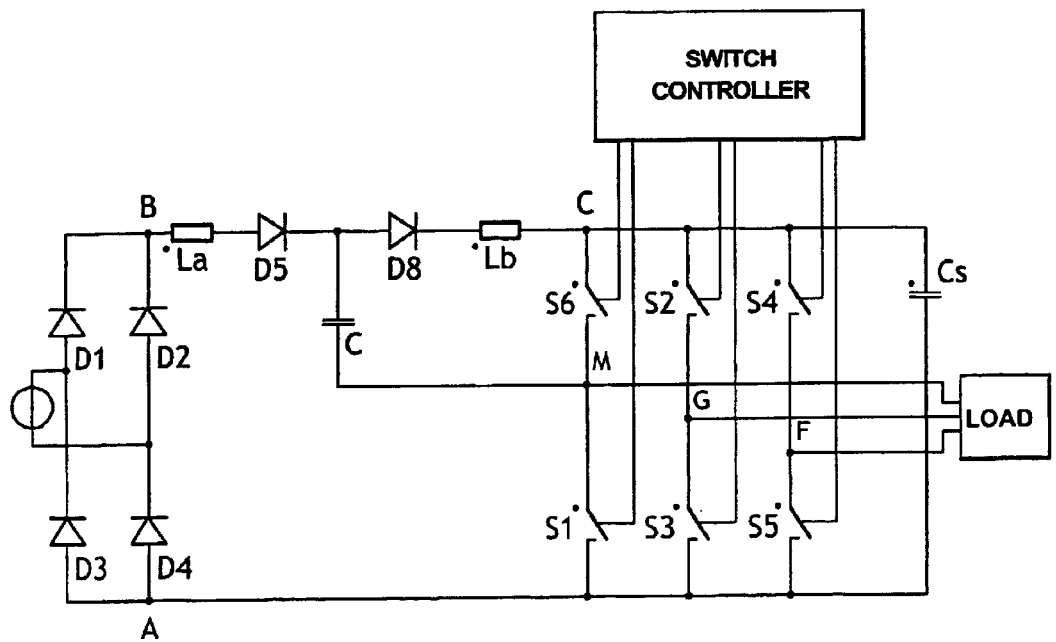
FIG. 4 shows another possible variant configuration.

An embodiment of this kind is shown in FIG. 4. In this embodiment, the diodes D6, D7, D9, and D10, and also the capacitors C1 and C2 are omitted, and only one of the branches of the inverter (in this case the branch constituted by the switches S1 and S6) is connected to the resonant circuit La, C.

What is claimed is:

1. A power supply control device comprising a configuration comprising a voltage source, a resonant inverter circuit powered by said source and comprising a plurality of switch half-bridges connected to the terminals of capacitor means, said configuration also comprising means for controlling the opening and closing of said switches and means for modifying the chopper frequency, a bridge of diode-forming elements connected between the source and the half-bridges of the inverter circuit, and resonant capacitor means connected between the midpoints of the branches of the diode bridge and the midpoints of the half-bridges of the inverter circuit, the device being characterized in that the resonant means further comprise inductor means connected on either side of the bridge of diode-forming elements.

2. A device according to claim 1, characterized in that it includes means suitable for selectively disconnecting the midpoints of the various interrupter bridges and the resonant means connected thereto.

3. A three-phase control device according to claim 1 or claim 2.

4. A device according to claim 2, characterized in that the midpoint of only one of the half-bridges of the inverter circuit is connected directly to the resonant means.

5. A device according to claim 1, characterized in that the switches are controlled under pulse width modulation.

6. A low frequency inverter, characterized in that it is constituted by a power supply device according to claim 1.

7. A device for controlling an induction motor, characterized in that it is constituted by a power supply device according to claim 1.

8. A method of controlling power supply including a voltage source, a resonant inverter circuit powered by said source and a plurality of switch half-bridges connected to the terminals of capacitor means, means for controlling the opening and closing of said switches, a bridge of diode-forming elements connected between the source and the half-bridges of the inverter circuit, and resonant capacitor means connected between the midpoints of the branches of the diode bridge and the midpoints or the half-bridges of the inverter circuit, inductor means connected on either side of the bridge of diode-forming elements, said method comprising modifying a chopper frequency of the means for controlling opening and closing of the switches.

* * * * *

UNITED STATES PATENT AND TRADEMARK OFFICE
CERTIFICATE OF CORRECTION

PATENT NO. : 6,924,992 B2 Page 1 of 1
APPLICATION NO. : 10/363720
DATED : August 2, 2005
INVENTOR(S) : Gaudin et al.

It is certified that error appears in the above-identified patent and that said Letters Patent is hereby corrected as shown below:

Col. 6, Line 3
In Claim #8, please delete "or" and insert -- of --.

Signed and Sealed this

Fifth Day of June, 2007

JON W. DUDAS
*Director of the United States Patent and Trademark Office*